Patented Nov. 18, 1952

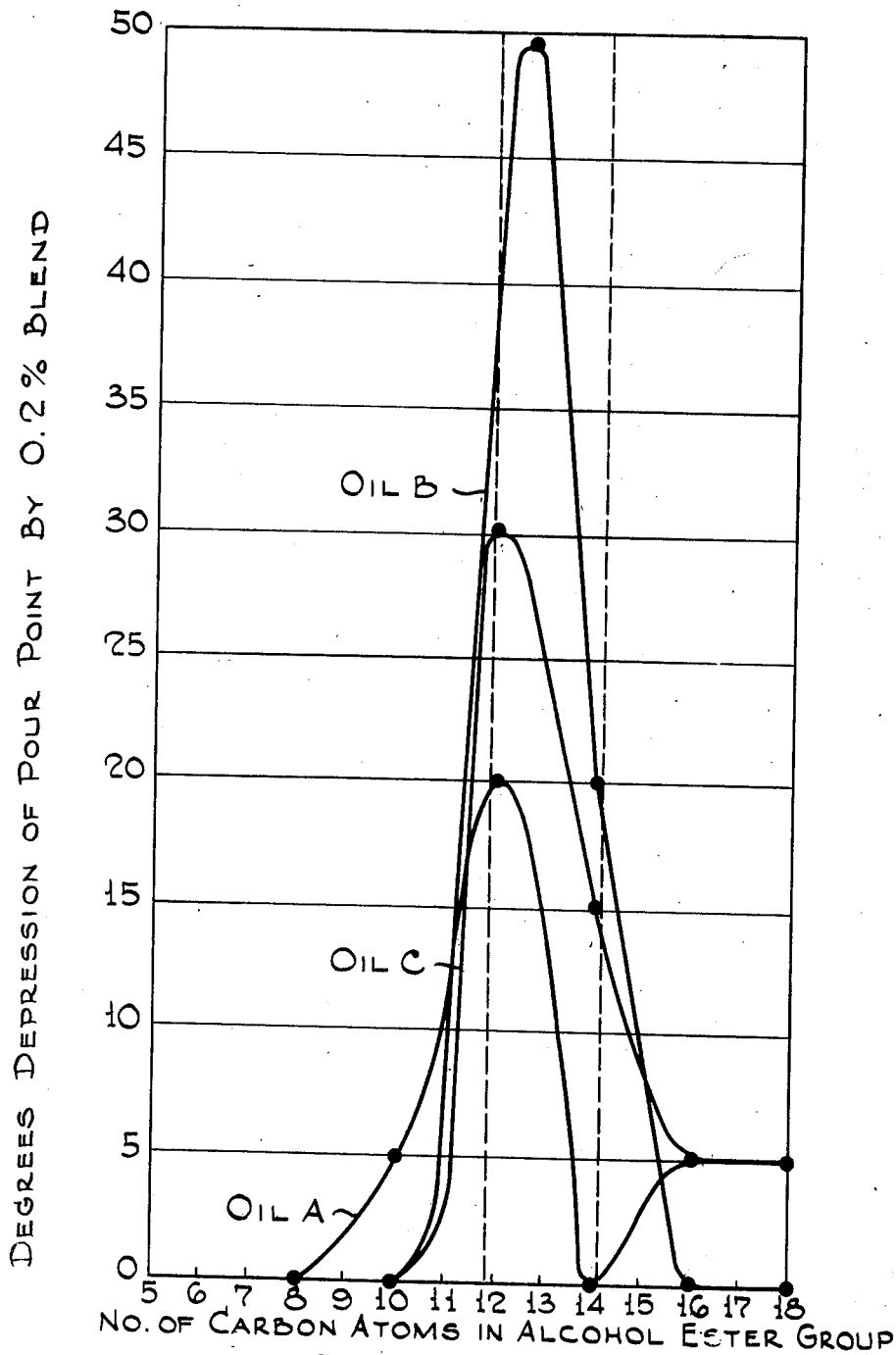

2,618,602

UNITED STATES PATENT OFFICE 2,618,602

LUBRICATING COMPOSITION OF LOW POUR POINT

Jeffrey H. Bartlett, Westfield, N. J., assignor to Standard Oil Development Company, a corporation of Delaware Application December 17, 1949, Serial No. 133,534

9 Claims. (Cl. 252—56)

This invention relates to lubricating compositions of low pour point and related characteristics. More particularly, it relates to novel products made by adding to waxy lubricating oils, and the like, pour point depressing and/or viscosity index improving agents obtained by the polymerization of certain specific alkyl fumarate esters and closely related materials. These polymer products have been found particularly useful as an additive for various lubricating oils, especially waxy lubricating oils of mineral oil base, not only for depressing or lowering the pour point thereof but also for improving the viscosity index thereof. The present application is a continuation-in-part of application Serial No. 638,444 filed December 29, 1945, now Patent No. 2,509,203, patented May 30, 1950, by the present inventor.

It has heretofore been suggested that oils and oily materials of low pour point may be obtained by adding high molecular weight products obtained by Friedel-Crafts condensation of an aliphatic material such as chlorinated paraffin wax with an aromatic material such as naphthalene or phenol. The resulting products, however, although quite satisfactory for such purposes, are not viscosity index improvers. It has also been suggested that lubricating oil additives may be made by polymerization of an unsaturated ester such as the vinyl ester of stearic acid, or by polymerization of acrylic acid esters such as octadecyl acrylate. Alternatively, condensation polymers of an unsaturated alcohol and an unsaturated acid may be used. Some of such products have shown good viscosity index improving properties but not good pour depressing properties, and some vice versa. Some of the latter have shown a tendency towards gel formation and towards becoming insoluble in highly paraffinic lubricating oil base stocks. Hence, they cannot be used in all types of oils. Attempts have also been made to produce a pour depressor by polymerization of an unsaturated ester such as decyl fumarate, but the resulting polymer is found to have substantially no pour depressing properties.

The present invention is based on a very surprising discovery that the normal $C_{12}$ saturated alcohol, called lauryl alcohol or dodecanol, and to a lesser degree the tetradecyl alcohol and mixtures of these seem to be the only ones of the saturated aliphatic alcohols of the $C_1$ to $C_{18}$ series which, when esterified with fumaric acid and its immediate homologues, such as mesaconic acid, and then polymerized, make a product having excellent pour depressing properties when added to waxy mineral lubricating oils in small amounts. By itself, the n-tetradecyl ($C_{14}$) alcohol produces a fumarate or mesaconate ester which may be polymerized to a product having fair pour depressing properties, and, if available, the $C_{13}$ alcohol ester apparently would also give good results, but similar esters of alcohols having 16 or more, or having 10 or less, carbon atoms appear to have no pour depressing properties whatsoever. The monomers, of course, also have no pour depressing or viscosity index improving properties.

The esters, which are polymerized or copolymerized according to the present invention, have the general formula

wherein $R_1$ and $R_2$ are $C_{12}$ to $C_{14}$ alkyl groups, usually but not necessarily alike, and $R_3$ and $R_4$ may be either hydrogen or methyl.

In carrying out the invention, as applied to n-lauryl alcohol, lauryl fumarate is first prepared either by direct esterification of lauryl alcohol with fumaric acid, or by ester interchange, i. e., by reacting lauryl alcohol with a lower alkyl fumarate such as a methyl fumarate or di-ethyl fumarate, these esterification reactions being known in a general way. The lauryl fumarate is then polymerized, preferably by the use of a peroxide catalyst, such as benzoyl peroxide or acetyl peroxide, etc. Temperatures in the range of 50° to 150° C. are suitable when using 0.1 to 5.0% by weight of catalyst and the time may be approximately from 5 to 100 hours or so, preferably about 10 to 50 hours at a temperature of around 75° to 85° C. Oxygen should be excluded during polymerization, by using an inert gas such as nitrogen, $CH_4$, $C_2H_6$, $H_2$, $CO_2$, etc. If desired, an inert solvent such as heptane, iso-octane, cyclohexane, etc. may be employed as a diluent to control polymer molecular weight.

The effect of the molecular weight of the lauryl fumarate polymer is relatively great from the point of view of viscosity index, but relatively unimportant from the point of view of pour point. The higher the molecular weight, the greater will be the viscosity index obtained with a given quantity of polymer. For this reason, molecular weights as high as 20,000 or up to 30,000, and in some cases 40,000, may be employed where an increase in viscosity index is desired. On the other hand, when the polymer is used chiefly for its pour depressing effect, molecular weights can be considerably lower. In this case, it can be below 10,000 and as low as about 1000. These molecular weights may be determined by the well-known Staudinger viscosity method, using a standard di-isobutylene solution containing 5 to 12 mg. of the polymer per cc. of solution. The polymer per se should generally have a viscosity of about 100 to 2,000 seconds Saybolt at 210° F.

If desired, the entire crude polymer product may be used, or it may be separated into fractions of any desired molecular weight range, as by successive precipitation of various fractions from solution in a solvent such as heptane by a precipitant such as methyl or ethyl alcohol or isopropyl alcohol or a mixture of alcohols.

The invention is applicable to derivatives or homologs of fumaric acid such as chlorofumaric acid, mesaconic acid and the chloromesaconic acid. Such acids, however, must be of the fumaroid type and not capable of forming anhydrides such as those of maleic acid.

The alkyl residue of the alcohol of 12–14 carbon atoms may also contain various substituents such as alkoxy, halogen, $NH_2$, $NO_2$, $SO_3H$, $CN$ and other groups as long as they do not interfere with the polymerization properties of the ester. The saturated primary alcohols are preferred, however, though the Oxo alcohols of similar chain length appear to be useful.

In general, it is preferable that the alkyl fumarate ester be essentially neutral although small quantities of the half ester appear to have no harmful effects on the polymerization reaction or on the properties of the resultant polymer. The peroxide type catalysts, such as benzoyl peroxide, urea peroxide, etc., are especially suitable for the polymerization. However, useful polymers for the purposes of this invention may also be produced by heating without a catalyst or by the use of relatively inert materials of mild catalytic action such as clay, alumina, etc. Useful polymers may also be produced by volatilization.

When catalysts are used to promote the polymerization, they may be added to the ester in a variety of ways. All the catalyst may be added at once or it may be added in small increments over a rather long period of time. It may also be dispersed in an inert liquid and then introduced. Furthermore, the monomer may be partially polymerized by one method and completed by another method. Hence, various methods may be used or various combinations of methods in the polymerization procedure. Preferred procedures are illustrated in the examples below.

The amount of lauryl fumarate or tetradecyl fumarate polymer to be used in the oil base stock, depends upon whether the primary purpose to be accomplished is improvement of pour point or viscosity index, and also depends upon the molecular weight range of the polymer, as well as to some extent upon the nature of the oil base stock, but generally the amount of polymer to be used will range from about .01% to 10%, the preferred range being 0.1% to 5% by weight, based on the total composition, the smaller amounts, e. g., 0.01 to about 2% being used when pour depressing only is required, and the larger amounts, e. g., 1% up to 10% for viscosity index improvement alone or together with pour depressing.

The oil base stock to be used is selected according to the purpose for which the blend is to be used. For instance, as a crankcase lubricant for an internal combustion engine, generally, mineral lubricating oils are used having a viscosity range of about 40 to 200 seconds Saybolt at 210° F. For such purposes, it is preferred to use waxy mineral lubricating oils of the paraffinic type which normally have a viscosity index in the range of 90 to 115. However, naphthenic lubricating oils may also be used, especially when enough of the fumarate polymer is used to raise the viscosity index substantially. The oil base stock may also be a lighter mineral oil fraction such as one of the gas oil or even the kerosene boiling range when it is to be used for special purposes, e. g., for hydraulic oils or gun recoil oils, etc. Small amounts of polymers of this invention may also be used in diesel fuels to reduce their pour point or cloud point, or both, particularly when the oil base stock is a highly paraffinic gas oil base stock.

The objects, advantages and details of the invention will be better understood from the following experimental data.

EXAMPLE 1

Didecyl fumarate was prepared by esterification of fumaric acid with n-decyl alcohol and the resulting didecyl fumarate was polymerized at 80° C. for sixteen hours with 0.5 weight per cent benzoyl peroxide and catalyst. The total product which was a heavy oil was dissolved in benzene, and methanol was then added to precipitate the polymer. Blends containing 0.2 weight percent of this polymer were made in three different test oils which were all paraffinic in nature and which had pour points ranging from +5° F. to +30° F. The didecyl fumarate polymer had no substantial pour depressing property in any of the three blends. Similarly negative results were obtained with polymers of di-n-butyl fumarate, di-n-hexyl fumarate, di-n-octyl fumarate and di-2-ethylhexyl fumarate, all of this series of fumarates having less than 10 carbon atoms in the alkyl group. Dimethyl fumarate was also tried but it would not even polymerize. Thus, the fumarate polymers of the decyl alcohol, having 10 carbon atoms, and all lower alcohols, did not give any pour depressing properties. A higher alcohol was tried having 18 carbon atoms, namely di-octadecyl fumarate polymer, but it likewise had no pour depressing properties. Further attempts were made, using alcohols having 12, 14 and 16 carbon atoms, with the surprising discovery previously mentioned, that although the $C_{16}$ alcohol, namely cetyl alcohol, was just as ineffective as all of the others tried, and the $C_{14}$ showed fair pour depressing properties especially when the polymer had a viscosity of about 60 to 400 seconds Saybolt at 210° F., yet the $C_{12}$ alcohol, namely n-lauryl, was found to produce an excellent pour point depressor for waxy oils. In all three base stocks, this product showed good general pour point depressing characteristics. The lauryl alcohol used was of the highest purity obtainable, being at least 90% pure.

In making these tests, the general method used was first to make a mixture of one mol of fumaric acid with two mols of the alcohol, and about ½ volume of inert solvent, and heat the mixture in the presence of a small amount of an acidic catalyst. The water formed by the esterification reaction was removed by refluxing about 9 hours. After esterification was substantially complete, the ester reaction mixture, either as such or diluted with a volatile solvent, e. g., benzene, was washed several times with dilute sodium carbonate solution and with water. The solvent was removed by evaporation on a steam bath, followed by blowing with nitrogen gas accompanied by use of vacuum, at about 95° C.

In each case, the ester was then polymerized in the absence of a solvent, with 1% of benzoyl peroxide as catalyst, at a temperature of approximately 80° C. in a nitrogen atmosphere for about 40–45 hours.

The total crude fumaric ester polymers were then blended in 0.2% concentration in the three different paraffinic lubricating oil base stocks mentioned above (which differed from each other chiefly only in the extent of dewaxing), and were tested for ASTM pour point. The results of this series of tests are shown in the following table:

TABLE I

| No. of C's | Alcohol used in fumarate polymerize | ASTM pour points (°F.) in— | | |
|---|---|---|---|---|
| | | Oil A | Oil B | Oil C |
| None | | 5 | 15 | 30 |
| 4 | n-butyl | 5 | 15 | 30 |
| 6 | n-hexyl | 5 | 15 | 30 |
| 8 | n-octyl | 5 | 15 | 30 |
| 8 | 2-ethyl hexyl | 5 | 15 | 30 |
| 10 | n-decyl | 0 | 15 | 30 |
| 12 | n-lauryl | −15 | −15 | −20 |
| 14 | n-tetradecyl | 5 | 0 | 10 |
| 16 | n-cetyl | 0 | 10 | 30 |
| 18 | n-octadecyl | 0 | 20 | 30 |

It is apparent from the above data that the $C_{12}$ (lauryl) and $C_{14}$ (tetradecyl) were the only ones out of the entire list of alcohols ranging from 1 to 18 carbon atoms which gave polymers having any substantial pour depressing property in waxy mineral lubricating oils, and of these two alcohols, the $C_{12}$ was much more effective than the $C_{14}$.

The polylauryl fumarate polymer also shows excellent pour stability characteristics, because an 0.2 weight per cent blend of this polymer in oil C base stock did not go solid in a cycling type pour stability test even at temperatures as low as −20° F., whereas a similar blend of a commercial pour depressor on the market, which gave ASTM pour points ranging from −20° to −30° F. in the same oil base stocks A, B and C, went solid at 20° F. when tested in oil C in the same pour stability test, which involves subjecting the blend to alternate cooling and warming at various temperatures more or less simulating field storage conditions.

It is understood, of course, that 0.2% is not necessarily the optimum quantity of polymer for the purpose, but such a quantity usually serves well as a basis of comparison.

The details of the preparation and polymerization of the di-n dodecyl (lauryl) fumarate used in the above tests are as follows:

A 3-liter round bottom flask equipped with a water trap and a reflux condenser was charged with:

932 g. n dodecanol of at least 90% purity
290 g. fumaric acid
2 g. sulfosalicylic acid
400 cc. xylene
200 cc. 54 naphtha The above mixture was refluxed for 9 hours during which time 89 cc. of water was collected in the water trap. The reaction mixture was then given 2 washes with 5% sodium carbonate followed by one water wash. Most of the solvent was removed by evaporation on a steam bath although the final traces were removed by the use of $N_2$ and laboratory vacuum at 95° C. The resulting di-n dodecyl fumarate ester had a saponification number of 248 and a neutralization number of 0.36 and with a viscosity at 210° F. of 42.6 Saybolt seconds. A 25 x 200 mm. test tube was charged with 25 g. of the above prepared ester and placed in a bath at 80° C. After replacing the air in the test tube with $N_2$, 0.25 g. of benzoyl peroxide was added and the mixture blown with $N_2$ until the peroxide was dissolved in the ester. The test tube was then stoppered and allowed to remain in the bath for 40 hours. At the end of the 40 hours, the polymer which was produced was of a light color and had a viscosity at 210° F. of 1107 Saybolt seconds.

The following blends of the above prepared polymerized di-n dodecyl fumarate were made in paraffin base oils designated as A, B and C.

| Additive(s) | Oil A | Oil B | Oil C | Condition of blend severe temperature cycle |
|---|---|---|---|---|
| | °F. | °F. | °F. | |
| None | 5 | 20 | 30 | 30° F. |
| 0.2% monomer | 5 | 20 | 30 | 30° F. |
| 0.2% polymer | −15 | −15 | −20 | DNGS. |
| 0.2% polymer+0.03% dodecanol | −10 | −20 | −15 | DNGS. |
| 0.2% polymer+0.09% di-n dodecyl fumarate (monomer) | −10 | −15 | −15 | DNGS. |

NOTE.—DNGS—did not go solid as low as −20° F.

These tests show that the ester monomer has no pour depressing properties, either as determined by the ASTM pour point test or the pour stability cycle test, but that the polymer had excellent properties in both respects, and that these were not harmed by the presence of small amounts of either the ester monomer or even unreacted alcohol (dodecanol).

EXAMPLE 2

The details of the preparation of the di-n-tetradecyl fumarate used in the previously described tests are as follows:

A 3-liter flask equipped with a water trap and a reflux condenser was charged with the following:

1072 g. n-tetradecanol
290 g. fumaric acid 1.5 g. sulfosalicylic acid
400 cc. xylene
200 cc. 54 naphtha The above mixture was refluxed for a total of 9 hours, during which time 90 cc. of water was collected. The reaction product was diluted with about 1000 cc. of benzol and then given 2 washes with 5% $Na_2CO_3$ solution and one with water. The larger part of the solvents was removed by evaporation on a steam bath, although the final traces were removed by the use of nitrogen and laboratory vacuum at 95° C. The resulting di-n-tetradecyl fumarate ester had a saponification number of 226, neutralization number of 0.36 and a viscosity at 210° F. of 46.5 Saybolt seconds.

Using the polymerization procedure described in Example 1, a polymerized di-n-tetradecyl fumarate was obtained which had a viscosity of 494 seconds Saybolt at 210° F. and in 0.2% concentration in reference oils A, B and C, gave ASTM pour points of 5° F., 0° F. and 10° F. respectively, which showed substantially pour point depressing properties. However, this polymer in 0.2% concentration in oil C gave −22° F. as the highest solid point in severe temperature cycles, thereby showing excellent pour stability.

EXAMPLE 3

Some of the same $C_{14}$ (di-n-tetradecyl) fumarate ester monomer used in Example 2 was polymerized at a higher temperature, namely 140° C. The resulting polymer which had a viscosity of 101 seconds Saybolt at 210° F., gave in 0.2% concentration in the same reference oils A, B and C blends having ASTM pour points of −5° F., −10° F., and −10° F. respectively. This indicates better results due to the higher temperature of polymerization.

EXAMPLE 4

*Preparation and polymerization of didodecyl mesaconate*

A 1 liter 3-necked flask equipped with a water trap, reflux condenser, stirrer and thermometer was charged with 186.3 g. dodecanol
66 g. mesaconic acid
1 g. toluene sulfonic acid
200 cc. toluene as entraining agent The above mixture was refluxed for 10 hours at 260° F. during which 17.5 cc. of water was collected. After diluting the mixture with about 500 cc. toluene it was given 3 washes with 5% $Na_2CO_3$ solution followed by 3 water washes. Next, the solvent was removed by use of house vacuum and nitrogen at 100° C. The resulting didodecyl mesaconate had a neutralization number of 0.32, a saponification number of 287.0 and a viscosity at 210° F. of about 40 Saybolt seconds. A 25 x 200 mm. test tube was charged with 40 g. of the above prepared ester and then heated to about 80° C. After replacing the air in the test tube with nitrogen, 2.0 g. of benzoyl peroxide was added and the mixture blown with nitrogen until the peroxide was dissolved. The test tube was then stoppered and placed in an oven at 80° C. for 24 hours followed by a further storage period of 16 hours at 100° C. At the end of this 40 hours of heating the light colored polymer had a viscosity at 210° F. of 74.6 Saybolt seconds.

EXAMPLE 5

*Preparation and polymerization of ditetradecyl mesaconate*

The ditetradecyl mesaconate was prepared under the same conditions used for preparing the didodecyl mesaconate of Example 4, yielding a monomer having a neutralization number of 4.48, a saponification number of 277.1, and a viscosity at 210° F. of 44.5 Saybolt seconds. By polymerizing 40 g. of the monomer with 4 g. benzoyl peroxide for 24 hours at 80° C. followed by 16 hours at 100° C., a polymer was obtained which had a viscosity at 210° F. of 96.6 Saybolt seconds.

EXAMPLE 6

*Copolymerization of didodecyl fumarate with didodecyl mesaconate*

A 25 x 200 mm. test tube was charged with 20 g. didodecyl fumarate and 20 g. didodecyl mesaconate and was polymerized with 2.0 g. benzoyl peroxide for 168 hours at 80° C., yielding a polymer which had a viscosity at 210° F. of 104.6 Saybolt seconds. The products of Examples 4, 5 and 6 were tested in oils A, B and C, mentioned above.

TABLE II

*ASTM pour depressant properties of mesaconate polymers*

| Pour depressant | Conc. | Oil A | Oil B | Oil C |
|---|---|---|---|---|
| None | | +5 | +20 | +30 |
| Didodecyl mesaconate polymer | 0.5 | −5 | −10 | +30 |
| Ditetradecyl mesaconate polymer | .2 | −5 | −15 | −5 |
| Didodecyl mesaconate } copolymer<br>Didodecyl fumarate | .5 | −20 | −25 | +25 |

EXAMPLE 7

*Preparation and fractionation of polymerized lauryl (didodecyl) fumarate*

A 2 liter 3-necked flask equipped with a stirrer and thermometer was charged with 1000 g. of didodecyl fumarate which had a neutralization number of 0.39 and a saponification number 241.1. After heating to 80° C., the air in the flask was replaced with nitrogen. Then a total of 10 grams of benzoyl peroxide were added in 4 equal portions at intervals during 5 hours. The reaction was continued for another 35 hours at 80° C. yielding a polymer having a viscosity at 210° F. of 892.8 Saybolt seconds. This was designated "crude polymer."

The fractionation of the crude polymer was carried out in a 12 liter round bottom flask to which a 250 cc. graduated separatory funnel had been affixed. This flask was charged with 500 g. of the crude polymer and 5 liters of 100% benzene. The resulting solution was agitated by means of a mechanical stirrer while 1750 cc. of methanol was added. The mixture was then allowed to stand at room temperature overnight after which the precipitated polymer was drawn off, dissolved in benzene, filtered and the benzene evaporated. This polymer was designated fraction "1."

The extract from the above step was treated with an additional 150 cc. of methanol with stirring and then allowed to stand overnight. The precipitate was separated and isolated as for fraction "1." It was designated fraction "2." This same process was continued for still further fractions. Fraction "3" required 175 cc.

methanol; fraction "4" required 300 cc. methanol; fraction "5" required 1200 cc. methanol; fraction "6" required 2675 cc. methanol+400 cc. water. The extract from the above precipitations was then distilled to remove benzol, methanol and water followed by dissolving the residue in benzene, filtering and evaporating. The data from the above fractionations are presented in the attached Tables III and IV.

TABLE III

*Fractionations of dodecyl Fumarate polymer pour depression data of cuts*

| Cut number | Conc. | Oil #A natural pour, +5 | Oil #B natural pour, +30 | Oil #C natural pour, +30 | Oil #D natural pour, +30 | Oil #E natural pour, +20 |
|---|---|---|---|---|---|---|
| Crude polymer | 0.01 | +5 | +20 | +25 | +30 | +15 |
| | .02 | −5 | +15 | +20 | +30 | −15 |
| | .03 | −5 | +10 | +15 | +25 | −15 |
| | .04 | −10 | +5 | +5 | +25 | −15 |
| | .05 | −10 | 0 | 0 | +25 | −15 |
| | .06 | −10 | +5 | 0 | +10 | −20 |
| | .08 | −15 | 0 | −5 | +5 | −15 |
| | .10 | −15 | 0 | −10 | 0 | −15 |
| Cut #1 | .01 | +5 | +15 | +15 | +25 | 0 |
| | .02 | −5 | +5 | +5 | +25 | −10 |
| | .03 | −5 | 0 | 0 | +15 | −15 |
| | .04 | −10 | 0 | 0 | | −10 |
| | .05 | −10 | −5 | | +5 | −15 |
| | .06 | −10 | −10 | 0 | +5 | −10 |
| | .08 | −15 | −10 | −5 | −5 | −10 |
| | .10 | −15 | −10 | −5 | −5 | −20 |
| | .15 | −15 | −15 | −5 | −15 | −25 |
| | .20 | −15 | −15 | −5 | −15 | |
| | .40 | −15 | −15 | −10 | | −20 |
| Cut #2 | .01 | +5 | +10 | +10 | +5 | −10 |
| | .02 | 0 | +5 | +10 | +5 | −10 |
| | .03 | −5 | +5 | +5 | +5 | −15 |
| | .04 | −5 | 0 | 0 | 0 | −15 |
| | .05 | −5 | −5 | −5 | 0 | −15 |
| | .06 | −5 | −10 | −5 | 0 | −20 |
| | .08 | −15 | −10 | | | −20 |
| | .10 | −15 | −10 | −10 | −15 | −20 |
| | .15 | −15 | −10 | −10 | −15 | −20 |
| | .20 | −15 | −10 | −10 | −15 | −15 |
| | .40 | −15 | −20 | −20 | −15 | −20 |
| Cut #3 | .01 | +5 | +10 | | | |
| | .02 | 0 | +5 | | | |
| | .03 | −5 | +5 | | | |
| | .04 | −10 | +5 | | | |
| | .05 | −10 | −5 | | | |
| | .06 | −10 | −10 | (1) | (1) | (1) |
| | .08 | −10 | −15 | | | |
| | .10 | −10 | −15 | | | |
| | .15 | | −15 | | | |
| | .20 | | −15 | | | |
| | .40 | −15 | −20 | | | |
| Cut #4 | .01 | −5 | +10 | +15 | +20 | 0 |
| | .02 | −5 | +10 | +10 | +15 | −15 |
| | .03 | −10 | +10 | +10 | +15 | −15 |
| | .04 | −10 | +5 | +5 | +10 | −20 |
| | .05 | −15 | +5 | +5 | +10 | −20 |
| | .06 | −15 | −5 | −5 | +10 | −20 |
| | .08 | −15 | −10 | −10 | 0 | −20 |
| | .10 | −15 | −15 | −10 | −5 | −25 |
| | .15 | −20 | −15 | −15 | −5 | −25 |
| | .20 | −20 | −20 | −15 | −5 | −25 |
| | .40 | −20 | −20 | −20 | −5 | −30 |
| Cut #5 | .01 | +10 | +20 | +30 | +30 | +25 |
| | .02 | 0 | +15 | +30 | +30 | −5 |
| | .03 | −10 | +15 | +25 | +30 | −10 |
| | .04 | −10 | +10 | +20 | +25 | −15 |
| | .05 | −15 | +10 | +15 | +30 | −15 |
| | .06 | −15 | 0 | +15 | +20 | −15 |
| | .08 | −20 | 0 | −5 | +15 | −15 |
| | .10 | −15 | 0 | −15 | +10 | −15 |
| | .15 | −15 | −10 | −15 | +10 | −20 |
| | .20 | −15 | −15 | −15 | 0 | −15 |
| | .40 | −25 | −20 | −20 | 0 | −20 |
| Cut #6 | .01 | 0 | | | | |
| | .02 | +5 | +30 | +30 | +30 | −25 |
| | .03 | +5 | +25 | +25 | +25 | +25 |
| | .04 | 0 | +25 | +25 | +25 | +20 |
| | .05 | −5 | +20 | +20 | +20 | +20 |
| | .06 | −10 | +20 | +20 | +20 | +20 |
| | .08 | | +25 | +25 | +25 | +20 |
| | .10 | −15 | +20 | +20 | +20 | +20 |
| | .15 | −20 | +25 | +25 | +20 | +15 |
| | .20 | −15 | | | | +5 |
| | .40 | −20 | +20 | +20 | +20 | −25 |

1 Not tested.
Oil #A, a conventionally refined Pennsylvania neutral of 100 V. I. with a viscosity at 210° F. of 45.3 Saybolt seconds.
Oil #B, a conventionally refined Mid-Continent neutral having a viscosity at 210° F. of 42.7 Saybolt seconds.
Oil #C, a conventionally refined Mid-Continent neutral+3.5% bright stock having a V. I. of 95 and a viscosity at 210° F. of 43.6.
Oil #D, a blend of 48% conventionally refined Mid-Continent neutral +52% Pennsylvania bright stock. Viscosity at 210° F.—67.6.
Oil #E, a conventionally refined Pennsylvania neutral oil.

TABLE IV
[*Summary of data from fractionation of dodecyl fumarate polymer.*]

| No. of fraction | Per-cent yield of fraction on charge | Per-cent yield of fraction on fractionation | Ubbe vis. 210° F. | Kinematic vis. on 12 mg./cc. of dimer | Mol. wt. | Monomeric molecules average |
|---|---|---|---|---|---|---|
| 1 | 2,38 | 2,43 | | 0.826 | 2,872 | 6.3 |
| 2 | 13.88 | 14.25 | 6,054.3 | .812 | 2,429 | 5.4 |
| 3 | 15.26 | 15.56 | 4,639.3 | .807 | 2,285 | 5 |
| 4 | 16.58 | 16.91 | 2,902.1 | .799 | 2,045 | 4.5 |
| 5 | 22.39 | 22.81 | 1,159.7 | .787 | 1,602 | 3.5 |
| 6 | 20.31 | 20.72 | 202.4 | .778 | 1,330 | 3 |
| Extract | 7.37 | 7.42 | 68.0 | .776 | 1,254 | 2.8 |
| Diisobutylene | | | | .740 | | |

Material balance—98%.
Average molecular weight of fractions—1850.
Average molecular weight of crude polymer—1,798.

The data from the fractionation of dodecyl fumarate polymer indicate that pour depressant activity is comparatively poor in polymers having a molecular weight of 1300 or lower, but that the activity increases with higher molecular weights. The fractions of Tables III and IV seemed to be most effective at a molecular weight of about 2,000, but the optimum molecular weight for other polymers and copolymers of this invention probably runs somewhat higher. The range of 1,500 to 3,000 molecular weight appears to be best for most homopolymers and copolymers of the fumaroid type.

In the claims which follow, the expression "fumaroid," where used, is intended to cover fumaric acid ester polymers related mesaconic acid products, and their immediate "trans" homologs, as distinguished from the maleic acid type ("cis") compounds.

What is claimed is:
1. A composition comprising a major proportion of an oil base stock and a minor proportion of polymerized di-alkyl fumaroid acid ester of a saturated aliphatic alcohol of 12 to 14 carbon atoms, said polymer having a molecular weight between 1000 and 30,000.
2. A composition comprising a major proportion of mineral oil and about 0.01 to 5% of polymerized didodecyl fumarate having an average molecular weight of about 1,000 to 30,000.
3. A composition comprising a major proportion of waxy mineral lubricating oil and at least a pour depressing amount of polymerized didodecyl mesaconate having an average molecular weight of between 1,000 and 30,000.
4. A composition according to claim 2 in which the polymer has an average molecular weight between 1,500 and 3,000.
5. A composition according to claim 3 in which the polymer has an average molecular weight between 1,500 and 3,000.
6. A lubricating composition comprising a major proportion of waxy mineral lubricating oil and at least a pour depressing amount of polymerized n-tetradecyl fumaroid acid dialkyl ester having an average molecular weight of about 1,000 to 30,000.
7. A composition comprising a major proportion of waxy hydrocarbon material having dissolved therein at least a wax-modifying amount of copolymerized fumaroid acid dialkyl esters of alcohols having more than 10 but less than 16 carbon atoms and having an average molecular weight between 1,000 and 30,000.
8. Composition according to claim 7 wherein the copolymer has a molecuar weight between 1,000 and 5,000.

9. Composition according to claim 7 wherein the copolymer has a molecular weight between 1,500 and 3,000.

JEFFREY H. BARTLETT.

REFERENCES CITED

The following references are of record in the file of this patent:

UNITED STATES PATENTS

| Number | Name | Date |
|---|---|---|
| 2,168,535 | Nuesslein | Aug. 8, 1939 |
| 2,342,113 | Blair | Feb. 22, 1944 |
| 2,491,683 | Munday et al. | Dec. 20, 1949 |
| 2,509,203 | Bartlett | May 30, 1950 |
| 2,560,588 | Munday et al. | July 17, 1951 |